(12) United States Patent
Shimokawara

(10) Patent No.: US 12,078,244 B2
(45) Date of Patent: Sep. 3, 2024

(54) AUTOMATIC TRANSMISSION

(71) Applicants: JATCO Ltd, Fuji (JP); NISSAN MOTOR CO., LTD., Yokohama (JP)

(72) Inventor: Kazue Shimokawara, Atsugi (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/261,919

(22) PCT Filed: Jan. 11, 2022

(86) PCT No.: PCT/JP2022/000493
§ 371 (c)(1),
(2) Date: Jul. 18, 2023

(87) PCT Pub. No.: WO2022/158327
PCT Pub. Date: Jul. 28, 2022

(65) Prior Publication Data
US 2024/0084892 A1    Mar. 14, 2024

(30) Foreign Application Priority Data
Jan. 20, 2021    (JP) .................................. 2021-007013

(51) Int. Cl.
*F16H 61/662*    (2006.01)
(52) U.S. Cl.
CPC .............................. *F16H 61/66259* (2013.01)

(58) Field of Classification Search
CPC ............ F16H 61/66259; F16H 2312/02; F16H 2312/022; F16H 2312/14
See application file for complete search history.

(56) References Cited

U.S. PATENT DOCUMENTS

| | | | |
|---|---|---|---|
| 2011/0087394 A1* | 4/2011 | Shimanaka | ........... B60W 10/115 903/902 |
| 2015/0369359 A1 | 12/2015 | Tsutsui et al. | |
| 2016/0097450 A1* | 4/2016 | Sato | ....................... F16H 37/022 475/208 |
| 2019/0338852 A1* | 11/2019 | Nakano | .................... F16H 61/66 |

FOREIGN PATENT DOCUMENTS

| | | |
|---|---|---|
| JP | 2001-173776 A | 6/2001 |
| JP | 2004-076906 A | 3/2004 |
| JP | 2010-230131 A | 10/2010 |
| JP | 2019-132351 A | 8/2019 |
| WO | WO-2014/133021 A1 | 9/2014 |

* cited by examiner

*Primary Examiner* — Edwin A Young
(74) *Attorney, Agent, or Firm* — Foley & Lardner LLP

(57) ABSTRACT

An automatic transmission, in which when starting with an accelerator pedal opening less than a predetermined opening, the automatic transmission is set to a first speed ratio, and when starting with the accelerator pedal opening equal to or greater than the predetermined opening, the automatic transmission is set to a second speed ratio lower than the first speed ratio.

6 Claims, 7 Drawing Sheets

_US 12,078,244 B2_

AUTOMATIC TRANSMISSION

TECHNICAL FIELD

The present invention relates to an automatic transmission, a control method for the automatic transmission, and a program.

BACKGROUND ART

Patent Literature 1 discloses a vehicle control device that, when there is an idle stop determination and a speed ratio of a continuously variable transmission (automatic transmission) is not the maximum speed ratio (lowest speed ratio), sets a forward clutch to a disengaged state and drains a hydraulic pressure of a primary pulley to return the continuously variable transmission to the maximum speed ratio before an engine stops. In this control device, a movable sheave of the primary pulley is in contact with a stopper at the maximum speed ratio. Therefore, due to a reaction force from the stopper, a thrust of a secondary pulley acts as an assist force on the primary pulley via a belt tension. In this way, the belt is prevented from slipping even when supply of the hydraulic pressure to the primary pulley is delayed.

PRIOR ART DOCUMENT

Patent Literature

Patent Literature 1: JP2010-230131A

SUMMARY OF INVENTION

However, when the speed ratio of the automatic transmission is the maximum speed ratio, an engine rotation speed may become high during starting of a vehicle, and fuel consumption may deteriorate. On the other hand, in order to improve acceleration performance during starting of the vehicle, the vehicle is required to run at the maximum speed ratio.

The present invention is made in view of the above problem, and an object thereof is to improve the acceleration performance during starting of the vehicle while suppressing the deterioration in fuel consumption.

According to one aspect of the present invention, an automatic transmission, wherein when starting with an accelerator pedal opening less than a predetermined opening, the automatic transmission is set to a first speed ratio, and when starting with the accelerator pedal opening equal to or greater than the predetermined opening, the automatic transmission is set to a second speed ratio lower than the first speed ratio.

According to other aspect of the present invention, an automatic transmission shifted to a stopped speed ratio during stopping, before changing from a running state to a stopped state, wherein when starting with an accelerator pedal opening less than a predetermined opening, the automatic transmission is set to a speed ratio higher than the stopped speed ratio, and when starting with the accelerator pedal opening equal to or greater than the predetermined opening, the automatic transmission is set to the stopped speed ratio.

According to other aspect of the present invention, an automatic transmission shifted to a stopped speed ratio during stopping, before changing from a running state to a stopped state, wherein when starting with an accelerator pedal opening less than a predetermined opening, the automatic transmission is set to the stopped speed ratio, and when starting with the accelerator pedal opening equal to or greater than the predetermined opening, the automatic transmission is set to a speed ratio lower than the stopped speed ratio.

According to the above aspect, when the accelerator pedal opening is equal to or greater than the predetermined opening, the vehicle is started with the automatic transmission set to a speed ratio lower than the speed ratio when the accelerator pedal opening is less than the predetermined opening, so that it is possible to achieve starting acceleration corresponding to an acceleration request from a driver. On the other hand, when the accelerator pedal opening is less than the predetermined opening, the vehicle is started with the automatic transmission set to a speed ratio higher than the speed ratio when the accelerator pedal opening is equal to or greater than the predetermined opening, so that the deterioration of fuel consumption can be suppressed. Therefore, it is possible to improve the acceleration performance during starting of the vehicle while suppressing the deterioration of fuel consumption.

DESCRIPTION OF EMBODIMENTS

Hereinafter, an embodiment of the present invention will be described with reference to the accompanying drawings. Hereinafter, when a speed ratio is large, it is referred to as being low, and when a speed ratio is small, it is referred to as being high. Further, the speed ratio being changed to be lower is referred to as downshift, and the speed ratio being changed to be higher is referred to as upshift.

Figure 1:
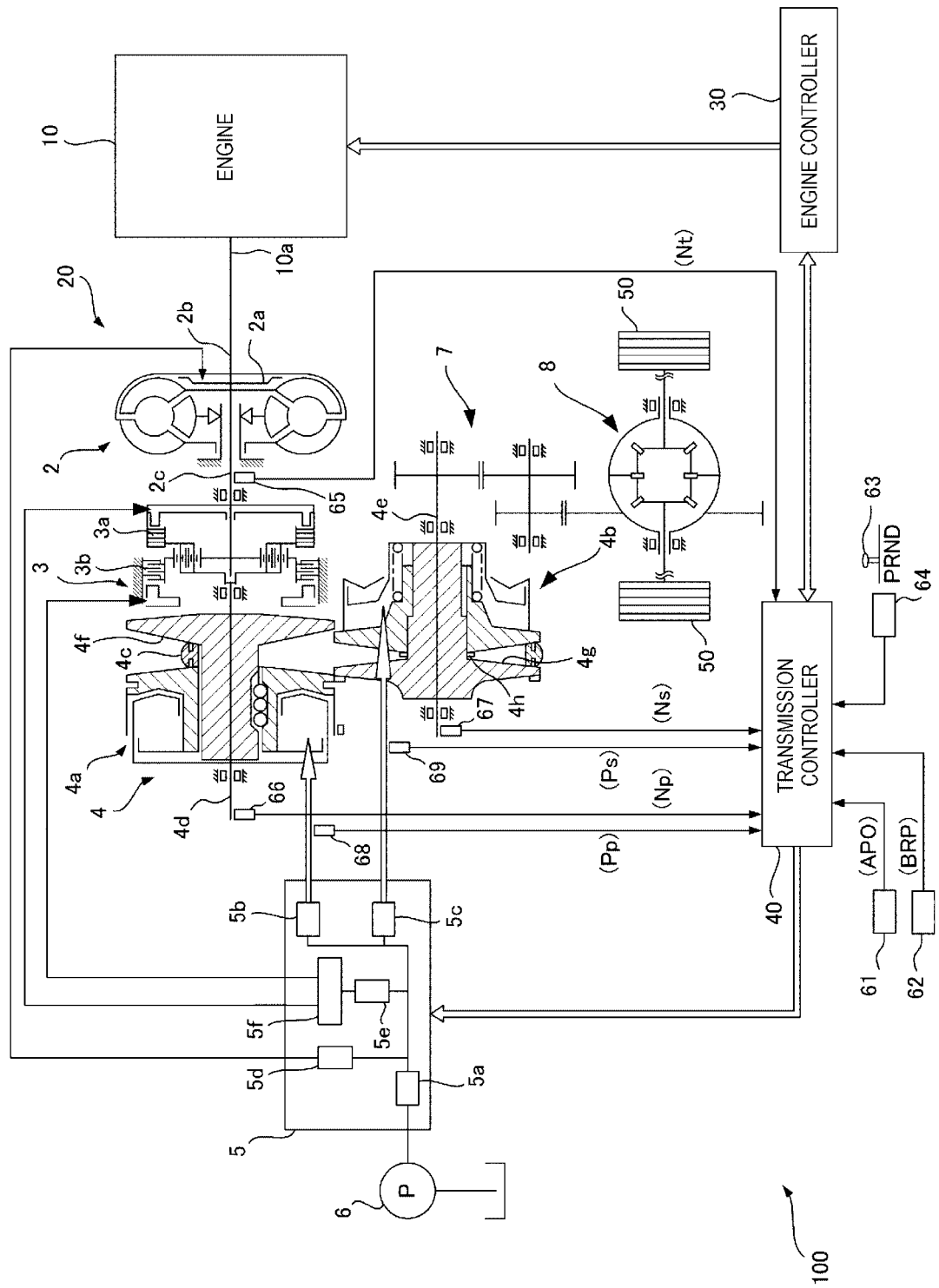
FIG. 1 is a schematic configuration diagram of a vehicle including an automatic transmission according to an embodiment of the present invention.

FIG. 1 is a schematic configuration diagram of a vehicle 100 including an automatic transmission 20 according to the embodiment of the present invention. As shown in FIG. 1, the vehicle 100 includes an engine 10 as a drive source, the automatic transmission 20, an engine controller 30, and a transmission controller 40.

The automatic transmission 20 includes a torque converter 2, a forward/reverse switching mechanism 3 as a power transmission mechanism, a variator 4 as a transmission mechanism, a hydraulic control circuit 5, and an oil pump 6.

In the vehicle 100, rotation generated in the engine 10 is transmitted to drive wheels 50 via the torque converter 2, the forward/reverse switching mechanism 3, the variator 4, a gear set 7, and a differential gear device 8.

The torque converter 2 is provided with a lockup clutch 2a. When the lockup clutch 2a is engaged, an input shaft 2b as an input element and an output shaft 2c as an output element of the torque converter 2 are directly connected to each other, and the input shaft 2b and the output shaft 2c rotate at the same speed. Therefore, when the lockup clutch 2a is engaged, rotation of the output shaft 10a of the engine 10 is directly transmitted from the output shaft 2c of the torque converter 2 to the forward/reverse switching mechanism 3.

The forward/reverse switching mechanism 3 includes a double pinion planetary gear set as a main component, a sun gear of which is coupled to the engine 10 via the torque converter 2, and a carrier of which is coupled to an input shaft 4d (primary pulley 4a) of the variator 4. The forward/reverse switching mechanism 3 further includes a forward clutch 3a that directly connects the sun gear and the carrier of the double pinion planetary gear set, and a reverse brake 3b that fixes a ring gear. When the forward clutch 3a is engaged, input rotation from the engine 10 via the torque converter 2 is directly transmitted to the primary pulley 4a, and when the reverse brake 3b is engaged, the input rotation from the engine 10 via the torque converter 2 is reversely decelerated and transmitted to the primary pulley 4a.

The variator 4 is a continuously variable transmission mechanism that shifts the rotation of the engine 10 transmitted to the input shaft 4d and transmits the shifted rotation from an output shaft 4e to the drive wheels 50. The variator 4 includes a primary pulley 4a provided on the engine 10 side of a power transmission path, a secondary pulley 4b provided on the drive wheels 50 side of the power transmission path, and a belt 4c, which is an endless member wound around the primary pulley 4a and the secondary pulley 4b.

In the variator 4, a hydraulic pressure supplied to the primary pulley 4a and a hydraulic pressure supplied to the secondary pulley 4b are controlled, so that a contact radius between each of the pulleys 4a and 4b and the belt 4c is changed, and a speed ratio is changed. The belt 4c is in contact with sheave surfaces 4f and 4g of the pulleys 4a and 4b to transmit power between the primary pulley 4a and the secondary pulley 4b.

The secondary pulley 4b is provided with a stopper 4h that defines a lowest speed ratio $R_{ML}$ on the lowest side in structure of the variator 4. Alternatively, the primary pulley 4a may be provided with a stopper, or both the pulleys 4a and 4b may be provided with stoppers.

The oil pump 6 is a mechanical oil pump that receives the rotation of the engine 10 and is driven using part of the power of the engine 10. Oil discharged from the oil pump 6 is supplied to the hydraulic control circuit 5.

The hydraulic control circuit 5 includes a regulator valve 5a that regulates pressure of hydraulic oil supplied from the oil pump 6 to generate a required hydraulic pressure, a primary solenoid valve 5b that adjusts a hydraulic pressure supplied to the primary pulley 4a, a secondary solenoid valve 5c that adjusts a hydraulic pressure supplied to the secondary pulley 4b, a lock-up solenoid valve 5d that adjusts a hydraulic pressure supplied to the lockup clutch 2a, a select solenoid valve 5e that adjusts a hydraulic pressure supplied to the forward clutch 3a and a hydraulic pressure supplied to the reverse brake 3b, a manual valve 5f that switches supply paths of the hydraulic pressures to the forward clutch 3a and the reverse brake 3b, and the like.

The hydraulic control circuit 5 supplies the adjusted hydraulic pressure to each part of the torque converter 2, the forward/reverse switching mechanism 3, and the variator 4 based on a control signal from the transmission controller 40.

The engine controller 30 is implemented by a microcomputer including a CPU, a RAM, a ROM, an input and output interface, and the like. The engine controller 30 performs various processing by reading and executing programs stored in the ROM by the CPU. The engine controller 30 may also be implemented by a plurality of microcomputers.

The engine controller 30 controls a rotation speed, a torque, and the like of the engine 10 based on signals from various sensors that each detect a state of a part of the vehicle 100.

The transmission controller 40 is implemented by a microcomputer including a CPU, a RAM, a ROM, an input and output interface, and the like, and is communicably connected to the engine controller 30. The transmission controller 40 performs various processing by reading and executing programs stored in the ROM by the CPU. The transmission controller 40 may also be implemented by a plurality of microcomputers. The transmission controller 40 and the engine controller 30 may be integrated into one controller.

The transmission controller 40 controls an engaged state of the lockup clutch 2a, the speed ratio of the variator 4, engaged states of the forward clutch 3a and the reverse brake 3b, and the like based on the signals from various sensors that each detect a state of a part of the vehicle 100.

The transmission controller 40 receives a signal from an accelerator pedal opening sensor 61 that detects an accelerator pedal opening APO, a signal from a brake fluid pressure sensor 62 that detects a brake fluid pressure BRP corresponding to an amount of operation on a brake pedal, a signal from an inhibitor switch 64 that detects a position of a shifter 63, a signal from a turbine rotation speed sensor 65 that detects a rotation speed Nt of the output shaft 2c of the torque converter 2, a signal from a primary rotation speed sensor 66 that detects a rotation speed Np of the input shaft 4d (primary pulley 4a) of the variator 4, a signal from a secondary rotation speed sensor 67 that detects a rotation speed Ns of the output shaft 4e (secondary pulley 4b) of the variator 4, a signal from a primary hydraulic pressure sensor 68 that detects a primary hydraulic pressure Pp supplied to the primary pulley 4a, a signal from a secondary hydraulic pressure sensor 69 that detects a secondary hydraulic pressure Ps supplied to the secondary pulley 4b, and the like.

Figure 2:
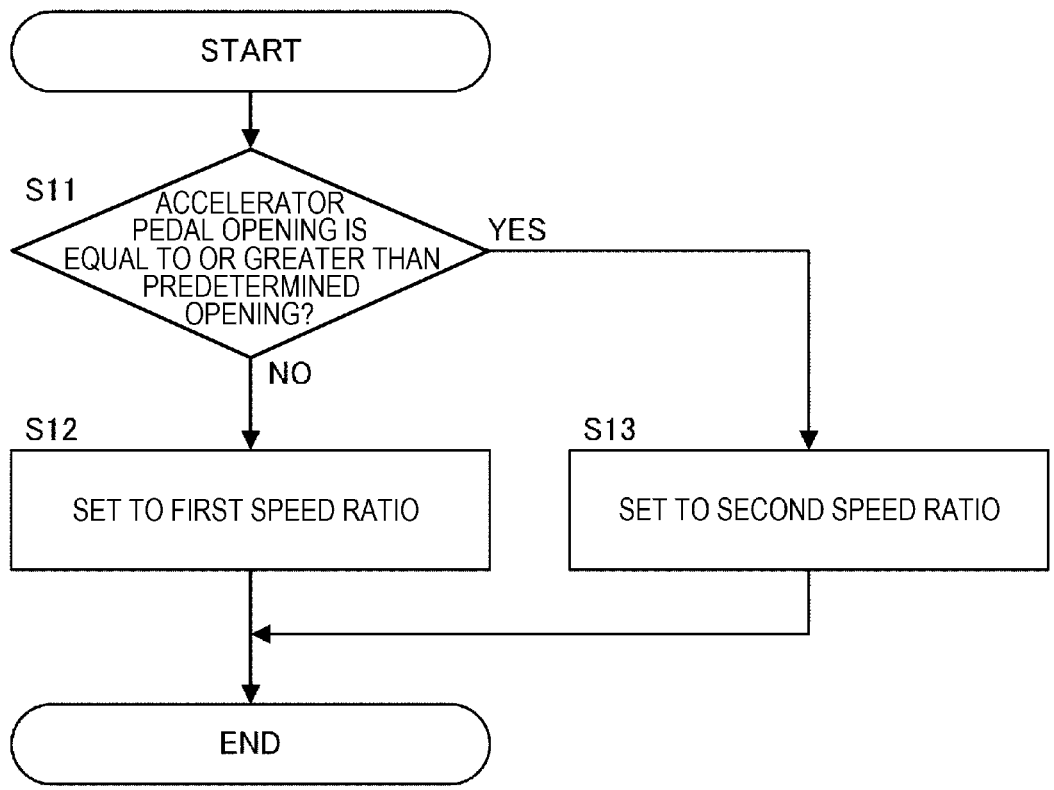
FIG. 2 is a flowchart showing shift control processing during starting performed by a transmission controller.
Figure 3:
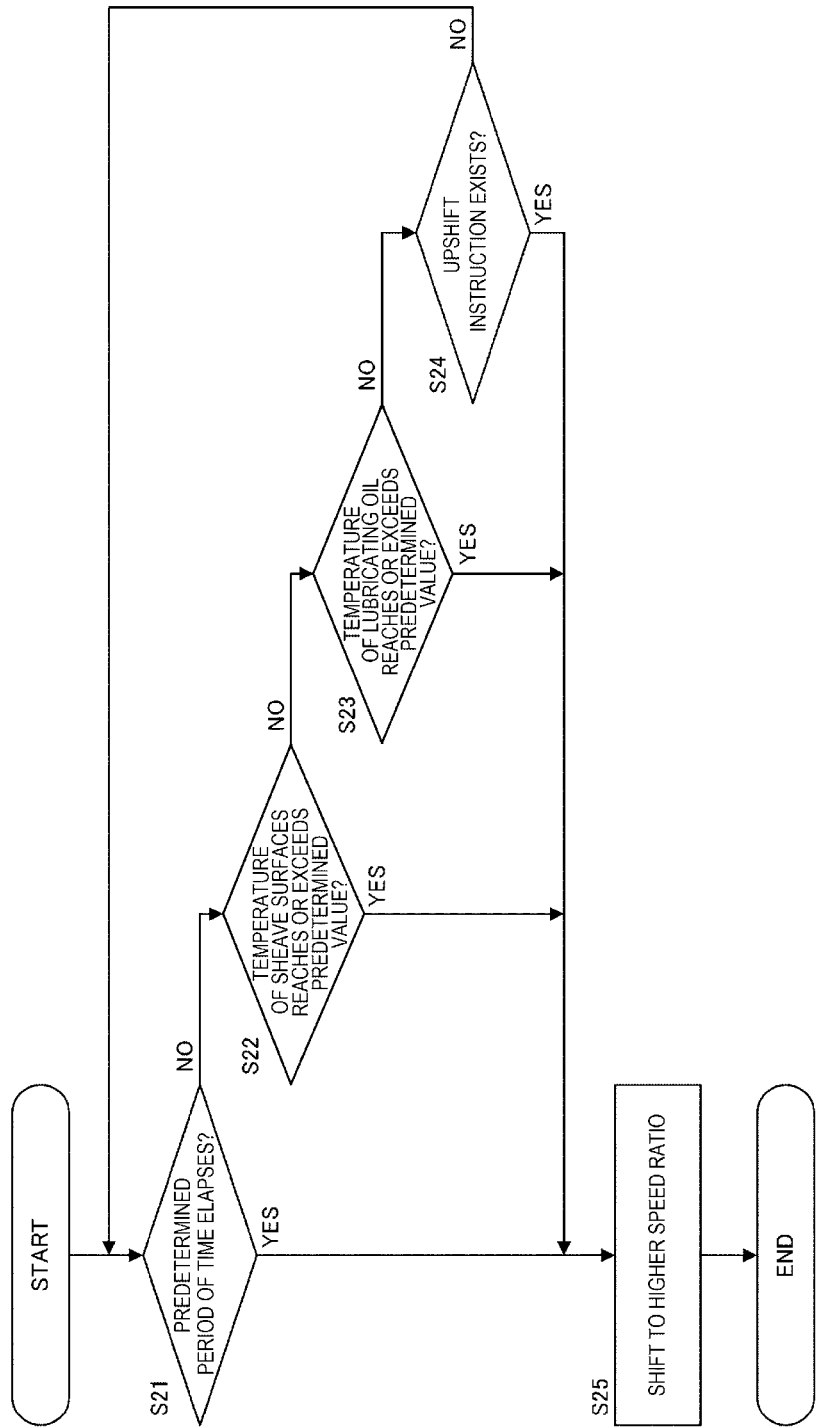
FIG. 3 is a flowchart showing shift control processing for shifting to a higher speed ratio after setting to a second speed ratio.

Next, shift control processing performed by the transmission controller 40 will be described with reference to FIGS. 2 and 3. FIG. 2 is a flowchart showing the shift control processing during starting performed by the transmission controller 40. FIG. 3 is a flowchart showing the shift control processing for shifting to a higher speed ratio after setting to a second speed ratio $R_2$. The shift control processing is executed by the transmission controller 40 at a regular time interval.

First, the shift control processing during starting performed by the transmission controller 40 will be described with reference to FIG. 2. The shift control during starting is executed when a driver depresses the accelerator pedal to start the vehicle 100.

Here, "start" refers not only to a case where the accelerator pedal is depressed so that a vehicle speed is changed from zero to a running state, but also to a case where the brake pedal is released and the vehicle is changed from a state of running at a small vehicle speed (creep running state) to a normal running state by the accelerator pedal being depressed.

In step S11, the transmission controller 40 determines whether the accelerator pedal opening APO during starting is equal to or greater than a predetermined opening. If it is determined in step S11 that the accelerator pedal opening APO is less than the predetermined opening, the processing proceeds to step S12. On the other hand, if it is determined in step S11 that the accelerator pedal opening APO is equal to or greater than the predetermined opening, the processing proceeds to step S13.

In step S12, since the accelerator pedal opening APO is relatively small and an acceleration request from the driver is not large, the transmission controller 40 sets the speed ratio of the automatic transmission 20 to a first speed ratio $R_1$.

In step S13, since the accelerator pedal opening APO is relatively larger and the acceleration request from the driver is large, the transmission controller 40 sets the speed ratio of the automatic transmission 20 to a second speed ratio $R_2$, which is lower than the first speed ratio $R_1$.

Here, before the vehicle 100 decelerates from the running state and enters the stopped state, the automatic transmission 20 is shifted to a stopped speed ratio $R_S$ during stopping. The stopped speed ratio $R_S$ is a low speed ratio $R_L$ on the lowest side in a range of speed ratios used in normal shift control. On the other hand, in the automatic transmission 20, during starting of the vehicle 100, the lowest speed ratio $R_{ML}$ on the lowest side of the structure of the variator 4, which is defined by the stopper 4h, is used. The lowest speed ratio $R_{ML}$ is a speed ratio lower than the range of speed ratios used in the normal shift control.

When starting with the accelerator pedal opening APO less than the predetermined opening, the automatic transmission 20 is directly set to the low speed ratio $R_L$ (the first speed ratio $R_1$), which is the stopped speed ratio $R_S$, and when starting with the accelerator pedal opening APO equal to or greater than the predetermined opening, the automatic transmission 20 is set to the lowest speed ratio $R_{ML}$ (the second speed ratio $R_2$), which is lower than the low speed ratio $R_L$. That is, when the acceleration request from the driver is large, the lowest speed ratio $R_{ML}$ on the lowest side that can be obtained structurally as the automatic transmission 20 including the pair of pulleys 4a and 4b is used to start.

In this way, when the accelerator pedal opening APO is equal to or greater than the predetermined opening, the vehicle is started with the lowest speed ratio $R_{ML}$, so as to respond to the start acceleration request from the driver. On the other hand, when the accelerator pedal opening APO is less than the predetermined opening, the vehicle is started with the low speed ratio $R_L$ higher than the lowest speed ratio $R_{ML}$, so that deterioration of fuel efficiency can be suppressed. Therefore, it is possible to improve acceleration performance during starting of the vehicle 100 while suppressing the deterioration of fuel consumption.

Instead, before the vehicle 100 decelerates from the running state to a stopped state, the automatic transmission 20 may be shifted to the lowest speed ratio $R_{ML}$. That is, the stopped speed ratio $R_S$ may be the lowest speed ratio $R_{ML}$.

In this case, when starting with the accelerator pedal opening APO less than the predetermined opening, the automatic transmission 20 is shifted to a speed ratio (the first speed ratio $R_1$) higher than the lowest speed ratio $R_{ML}$, which is the stopped speed ratio $R_S$, and when starting with the accelerator pedal opening APO equal to or greater than the predetermined opening, the automatic transmission 20 is directly set to the lowest speed ratio $R_{ML}$ (the second speed ratio $R_2$).

In this case as well, it is possible to improve the acceleration performance during starting of the vehicle 100 while suppressing the deterioration of fuel consumption.

Next, referring to FIG. 3, shift control processing for shifting to a high speed ratio after setting to the second speed ratio $R_2$ will be described. The shift control for shifting to a higher speed ratio is performed after the vehicle 100 is started with the automatic transmission 20 set to the second speed ratio $R_2$.

The automatic transmission 20 uses the lowest speed ratio $R_{ML}$, which is a speed ratio lower than the range of speed ratios used in the normal shift control. When using the lowest speed ratio $R_{ML}$ for a long time, a surface pressure acting on the sheave surfaces 4f and 4g, which are contact surfaces with the belt 4c, increases and a temperature of the sheave surfaces 4f and 4g rises. In the case where running with the lowest speed ratio $R_{ML}$ is continued, the engine rotation speed continues to be high, and there is a risk that fuel consumption will deteriorate.

Therefore, after responding to the acceleration request from the driver, the transmission controller 40 shifts the automatic transmission 20 to a speed ratio higher than the second speed ratio $R_2$. In this case, the automatic transmission 20 is desirably shifted to the first speed ratio $R_1$ or a speed ratio higher than the first speed ratio $R_1$.

In step S21, the transmission controller 40 determines whether a predetermined period of time elapses since the vehicle 100 is started. This predetermined period of time is set, for example, to several seconds. When it is determined in step S21 that a predetermined period of time elapses, the processing proceeds to step S25, and the automatic transmission 20 is shifted to a speed ratio higher than the second speed ratio $R_2$.

In this way, if a predetermined period of time elapses since the vehicle is started with the second speed ratio $R_2$ set (determination of Yes in step S21), the automatic transmission 20 is shifted to a speed ratio higher than the second speed ratio $R_2$ (step S25). As a result, the automatic transmission 20 is shifted to a higher speed ratio after a predetermined period of time elapses since the response to the acceleration request from the driver during starting of the vehicle 100, so that the deterioration of fuel consumption can be suppressed.

On the other hand, if it is determined in step S21 that a predetermined period of time does not elapse, the processing proceeds to step S22.

In step S22, the transmission controller 40 determines whether the temperature of the sheave surfaces 4f, 4g of the pulleys 4a, 4b reaches or exceeds a predetermined value. Here, the temperature of the sheave surfaces 4f, 4g is estimated by the following equation for example.

$$Tp = \Delta T + Tlub = (Qin - Qout)/C \times (t1 - t2) + Tlub$$

Here, Tp is a temperature [° C.] of the sheave surfaces 4f, 4g, and ΔT is a rising temperature [° C.], and Tlub is a lubricating oil temperature (oil pan oil temperature) [° C.], and (t1−t2) is a unit time [sec], and Qin is a heat generation rate [J/sec], and Qout is a heat dissipation rate [J/sec], and C is a heat capacity [J/° C.] Qin≈"thrust of primary pulley $4a$"×"slip amount", and "slip amount" is proportional to "rotation speed of primary pulley $4a$". Qout is obtained from a "chain lubrication flow rate" and a "rotation speed of the primary pulley $4a$", and the "chain lubrication flow rate" is obtained from the "rotation speed of the engine 10", a "line pressure", an "oil temperature", and "ON/OFF of the lockup clutch $2a$". The heat capacity C is obtained from the "lubrication flow rate" and the "rotation speed of the primary pulley $4a$".

If it is determined in step S22 that the temperature of the sheave surfaces $4f$, $4g$ reaches or exceeds the predetermined value, the processing proceeds to step S25, and the automatic transmission 20 is shifted to a speed ratio higher than the second speed ratio $R_2$.

In this way, even before a predetermined period of time elapses since the vehicle is started with the second speed ratio $R_2$ set (determination of No in step S21), if the temperature of the sheave surfaces $4f$, $4g$ of the pulleys $4a$, $4b$ reaches or exceeds the predetermined value (determination of Yes in step S22), the automatic transmission 20 is shifted to a speed ratio higher than the second speed ratio $R_2$ (step S25). As a result, when the temperature of the sheave surfaces $4f$, $4g$ of the pulleys $4a$, $4b$ reaches or exceeds the predetermined value after responding to the acceleration request from the driver during starting of the vehicle 100, the automatic transmission is shifted to a higher speed ratio, so that a load on the pulleys $4a$, $4b$ can be reduced.

On the other hand, if it is determined in step S22 that the temperature of the sheave surfaces $4f$, $4g$ does not exceed the predetermined value, the processing proceeds to step S23.

In step S23, the transmission controller 40 determines whether a temperature of lubricating oil reaches or exceeds a predetermined value. If it is determined in step S23 that the temperature of the lubricating oil reaches or exceeds the predetermined value, the processing proceeds to step S25, and the automatic transmission 20 is shifted to a speed ratio higher than the second speed ratio $R_2$.

In this way, even before a predetermined period of time elapses since the vehicle is started with the second speed ratio $R_2$ set (determination of No in step S21), if the temperature of the lubricating oil reaches or exceeds the predetermined value (determination of Yes in step S23), the automatic transmission 20 is shifted to a speed ratio higher than the second speed ratio $R_2$ (step S25). As a result, when the temperature of the lubricating oil reaches or exceeds the predetermined value after responding to the acceleration request from the driver during starting of the vehicle 100, the automatic transmission 20 is shifted to a higher speed ratio, so that the load on the pulleys $4a$, $4b$ can be reduced.

On the other hand, if it is determined in step S23 that the temperature of the lubricating oil does not exceed the predetermined value, the processing proceeds to step S24.

In step S24, the transmission controller 40 determines whether there is an upshift instruction. The upshift instruction is either an upshift instruction by automatic shift when the vehicle 100 accelerates to a certain speed, or an upshift instruction by returning the accelerator pedal when the driver releases the depressed accelerator pedal. If it is determined in step S24 that there is an upshift instruction, the processing proceeds to step S25, and the automatic transmission 20 is shifted to a speed ratio higher than the second speed ratio $R_2$.

In this way, even before a predetermined period of time elapses since the vehicle is started with the second speed ratio $R_2$ set (determination of No in step S21), if there is an upshift instruction (determination of Yes in step S24), the automatic transmission 20 is shifted to a speed ratio higher than the second speed ratio $R_2$ (step S25).

On the other hand, if it is determined in step S24 that there is no upshift instruction, the processing returns to step S21 to repeat the determination.

Next, the shift control during starting, which is performed by the transmission controller 40, will be specifically described with reference to FIGS. 4 to 7.

Figure 4:
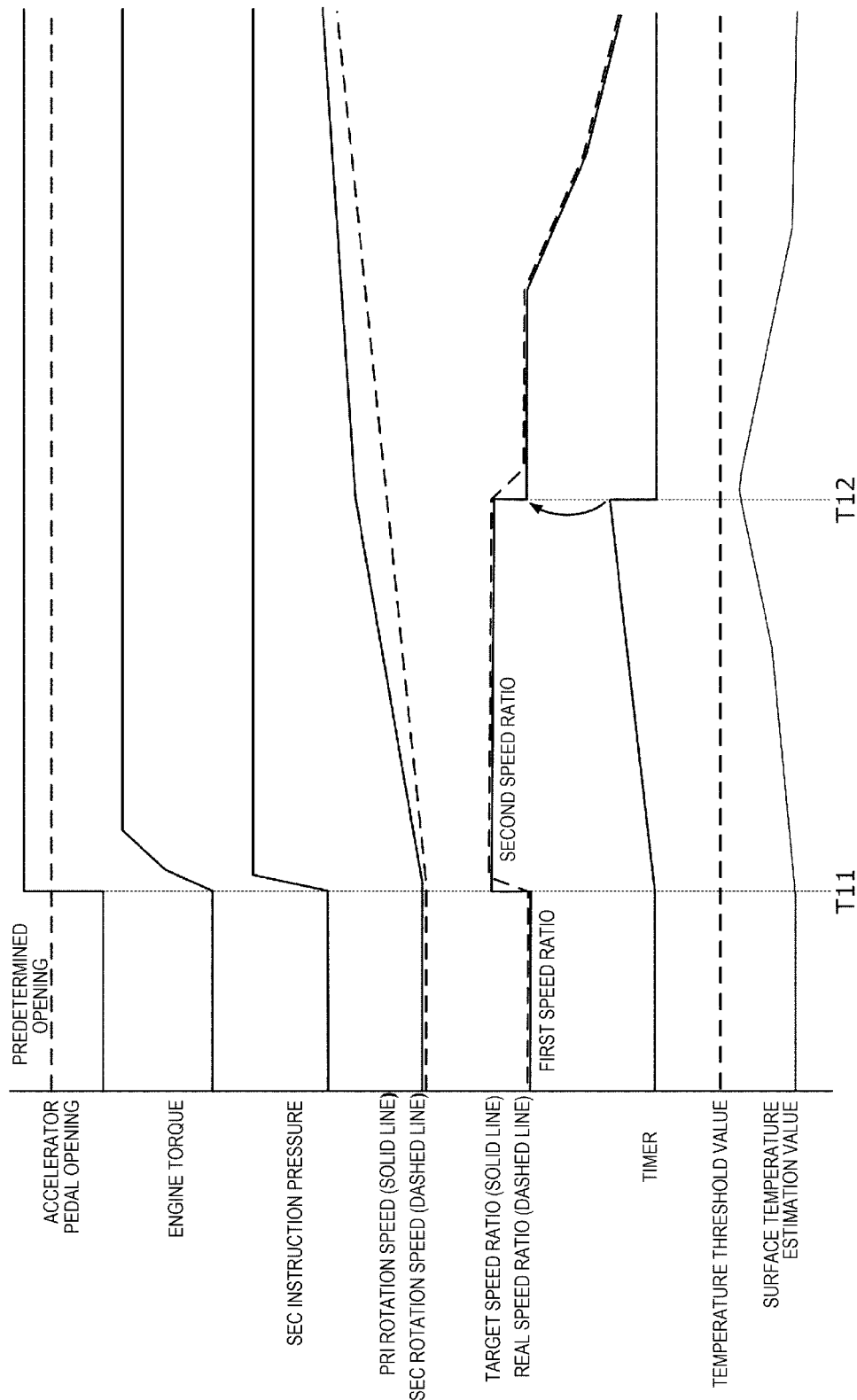
FIG. 4 is a timing chart for explaining that after starting with an accelerator pedal opening less than a predetermined opening, the automatic transmission is shifted to a higher speed ratio after a predetermined period of time elapses.

First, with reference to FIG. 4, the case where after starting with the accelerator pedal opening APO less than a predetermined opening, the automatic transmission is shifted to a higher speed ratio after a predetermined period of time elapses will be described. FIG. 4 is a timing chart for explaining that after starting with the accelerator pedal opening APO less than a predetermined opening, the automatic transmission is shifted to a higher speed ratio after a predetermined period of time elapses.

At a timing T11, the driver depresses the accelerator pedal. In this way, an engine torque increases. In this case, since the accelerator pedal opening APO is equal to or greater than the predetermined opening, an instruction pressure (SEC instruction pressure) of the hydraulic pressure supplied to the secondary pulley $4b$ increases. As a result, a target speed ratio of the automatic transmission 20 is changed from the low speed ratio $R_L$ (first speed ratio $R_1$), which is the stopped speed ratio $R_S$, to the lowest speed ratio $R_{ML}$ (second speed ratio $R_2$), which is lower than the low speed ratio $R_L$. A timer counts the elapsed time since the target speed ratio is set to the lowest speed ratio $R_{ML}$.

At a timing T12, a predetermined period of time elapses since the timing T11, and therefore the automatic transmission 20 is shifted to a speed ratio higher than the second speed ratio $R_2$. As a result, the automatic transmission is shifted to a higher speed ratio after a predetermined period of time elapses since the response to the acceleration request from the driver during starting of the vehicle 100, so that the deterioration of fuel consumption can be suppressed.

Figure 5:
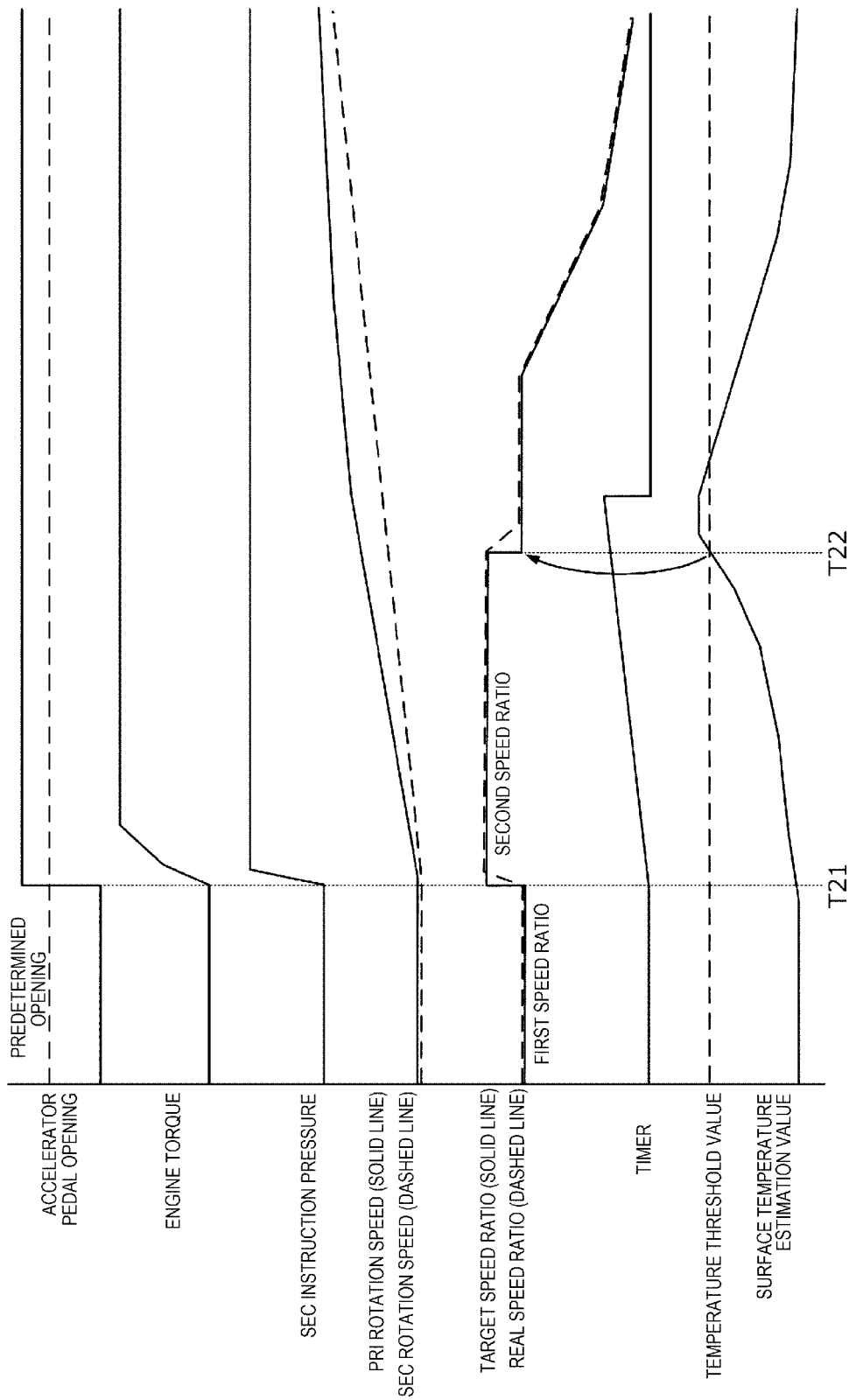
FIG. 5 is a timing chart for explaining that after starting with the accelerator pedal opening less than the predetermined opening, the automatic transmission is shifted to a higher speed ratio after a temperature of a sheave surface of a pulley reaches or exceeds a predetermined value.

Next, with reference to FIG. 5, the case where after starting with the accelerator pedal opening APO less than a predetermined opening, the automatic transmission is shifted to a higher speed ratio after the temperature of the sheave surfaces $4f$, $4g$ of the pulleys $4a$, $4b$ reaches or exceeds a predetermined value will be described. FIG. 5 is a timing chart for explaining that after starting with the accelerator pedal opening APO less than the predetermined opening, the automatic transmission is shifted to a higher speed ratio after the temperature of the sheave surfaces $4f$, $4g$ of the pulleys $4a$, $4b$ reaches or exceeds the predetermined value.

At a timing T21, the driver depresses the accelerator pedal. In this way, the engine torque increases. In this case, since the accelerator pedal opening APO is equal to or greater than the predetermined opening, the instruction pressure (SEC instruction pressure) of the hydraulic pressure supplied to the secondary pulley $4b$ increases. As a result, the target speed ratio of the automatic transmission 20 is changed from the low speed ratio $R_L$ (first speed ratio $R_1$), which is the stopped speed ratio $R_S$, to the lowest speed ratio $R_{ML}$ (second speed ratio $R_2$), which is lower than the low speed ratio $R_L$. The timer counts the elapsed time since the target speed ratio is set to the lowest speed ratio $R_{ML}$.

At a timing T22, although a predetermined period of time does not elapse since the timing T21, the temperature of the sheave surfaces $4f$, $4g$ of the pulleys $4a$, $4b$ reaches or exceeds the predetermined value, and therefore the automatic transmission 20 is shifted to a speed ratio higher than the second speed ratio $R_2$. In this way, the load on the pulleys 4a, 4b can be reduced.

The same shift control is performed even when the temperature of the lubricating oil, not the temperature of the sheave surfaces 4f, 4g, reaches or exceeds a predetermined value, and the load on the pulleys 4a, 4b can be reduced.

Figure 6:
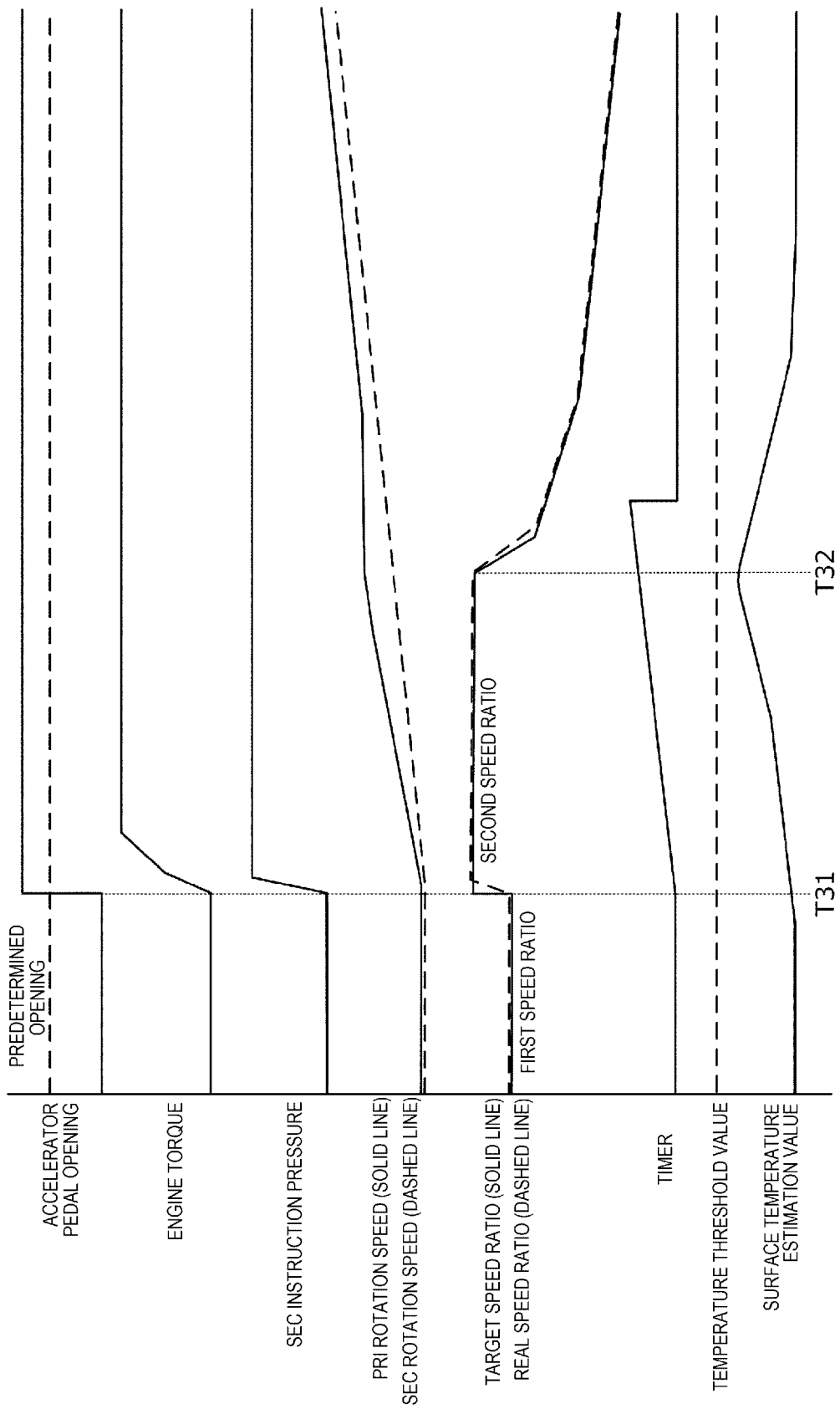
FIG. 6 is a timing chart for explaining that after starting with the accelerator pedal opening less than the predetermined opening, the automatic transmission is shifted to a higher speed ratio according to an upshift instruction by automatic shift.

Next, with reference to FIG. 6, the case where after starting with the accelerator pedal opening APO less than a predetermined opening, the automatic transmission is shifted to a higher speed ratio according to an upshift instruction by the automatic shift will be described. FIG. 6 is a timing chart for explaining that after starting with the accelerator pedal opening APO less than the predetermined opening, the automatic transmission is shifted to a higher speed ratio according to the upshift instruction by the automatic shift.

At a timing T31, the driver depresses the accelerator pedal. In this way, the engine torque increases. In this case, since the accelerator pedal opening APO is equal to or greater than the predetermined opening, the instruction pressure (SEC instruction pressure) of the hydraulic pressure supplied to the secondary pulley 4b increases. As a result, the target speed ratio of the automatic transmission 20 is changed from the low speed ratio $R_L$ (first speed ratio $R_1$), which is the stopped speed ratio $R_S$, to the lowest speed ratio $R_{ML}$ (second speed ratio $R_2$), which is lower than the low speed ratio $R_L$. The timer counts the elapsed time since the target speed ratio is set to the lowest speed ratio $R_{ML}$.

At a timing T32, the automatic transmission 20 is shifted to a speed ratio higher than the second speed ratio $R_2$ according to an upshift instruction by the automatic shift when the vehicle 100 accelerates to a certain speed.

In this way, even before a predetermined period of time elapses since the vehicle is started with the second speed ratio $R_2$ set, if there is an upshift instruction by the automatic shift, the automatic transmission 20 is shifted to a speed ratio higher than the second speed ratio $R_2$.

Figure 7:
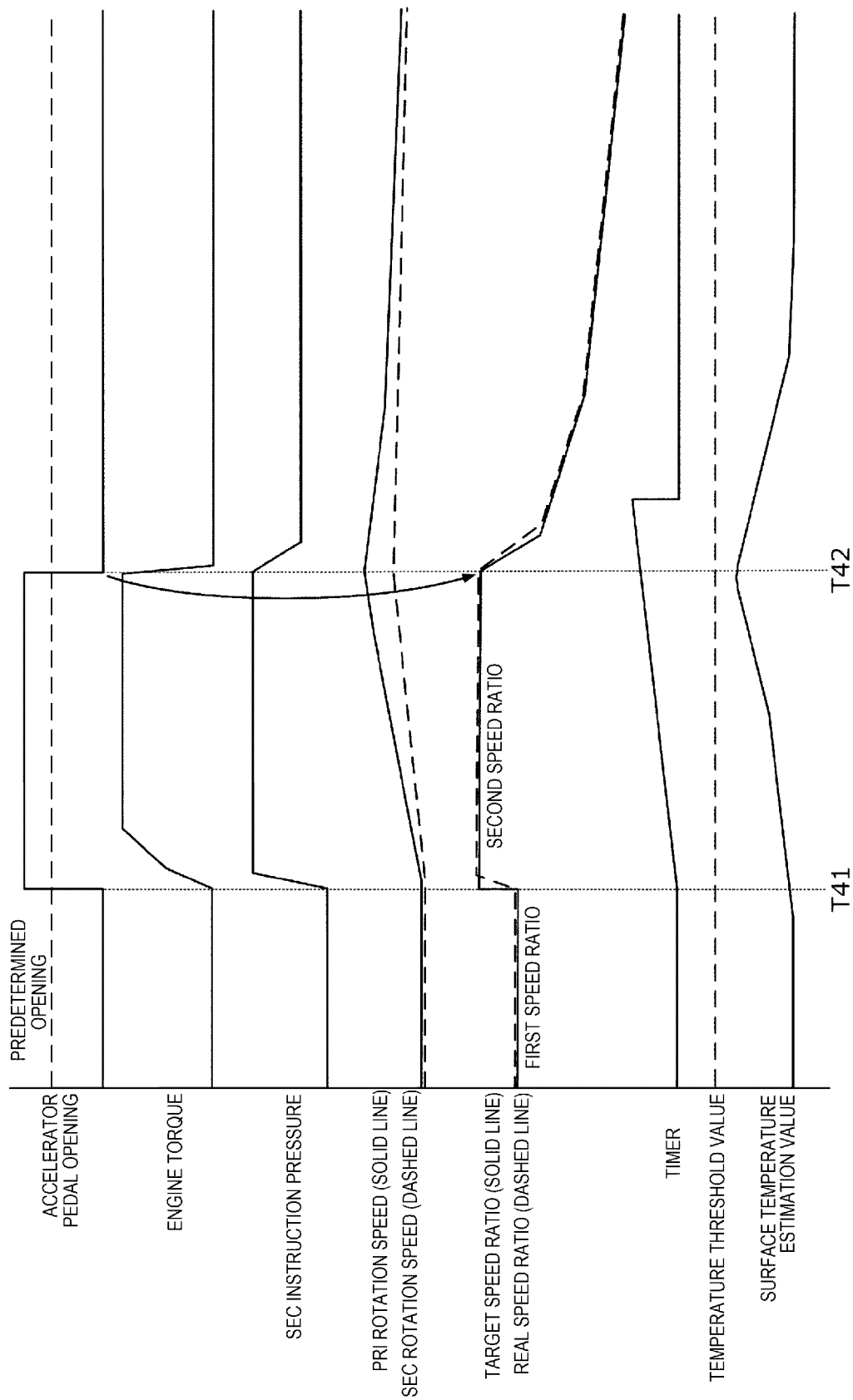
FIG. 7 is a timing chart for explaining that after starting with the accelerator pedal opening less than the predetermined opening, the automatic transmission is shifted to a higher speed ratio according to an upshift instruction by accelerator return.

Next, with reference to FIG. 7, the case where after starting with the accelerator pedal opening APO less than a predetermined opening, the automatic transmission is shifted to a higher speed ratio according to an upshift instruction by the accelerator return will be described. FIG. 7 is a timing chart for explaining that after starting with the accelerator pedal opening APO less than the predetermined opening, the automatic transmission is shifted to a higher speed ratio according to an upshift instruction by the accelerator return.

At a timing T41, the driver depresses the accelerator pedal. In this way, the engine torque increases. In this case, since the accelerator pedal opening APO is equal to or greater than the predetermined opening, the instruction pressure (SEC instruction pressure) of the hydraulic pressure supplied to the secondary pulley 4b increases. As a result, the target speed ratio of the automatic transmission 20 is changed from the low speed ratio $R_L$ (first speed ratio $R_1$), which is the stopped speed ratio $R_S$, to the lowest speed ratio $R_{ML}$ (second speed ratio $R_2$), which is lower than the low speed ratio $R_L$. The timer counts the elapsed time since the target speed ratio is set to the lowest speed ratio $R_{ML}$.

At a timing T42, the automatic transmission 20 is shifted to a speed ratio higher than the second speed ratio $R_2$ according to an upshift instruction by the accelerator return when the accelerator pedal depressed by the driver is released.

In this way, even before a predetermined period of time elapses since the vehicle is started with the second speed ratio $R_2$ set, if there is an upshift instruction by the accelerator return, the automatic transmission 20 is shifted to a speed ratio higher than the second speed ratio $R_2$.

The configurations and effects of the present embodiment described above will be collectively described.

When starting with the accelerator pedal opening APO less than a predetermined opening, the automatic transmission 20 is set to the first speed ratio $R_1$, and when starting with the accelerator pedal opening APO equal to or greater than the predetermined opening, the automatic transmission 20 is set to the second speed ratio $R_2$ lower than the first speed ratio $R_1$.

In the method for controlling the automatic transmission 20, when starting with the accelerator pedal opening APO less than a predetermined opening, the automatic transmission 20 is set to the first speed ratio $R_1$, and when starting with the accelerator pedal opening APO equal to or greater than the predetermined opening, the automatic transmission 20 is set to the second speed ratio $R_2$ lower than the first speed ratio $R_1$.

According to these configurations, when the accelerator pedal opening APO is equal to or greater than the predetermined opening, the vehicle is started with the automatic transmission 20 set to a speed ratio lower than the speed ratio when the accelerator pedal opening is less than the predetermined opening, so that it is possible to achieve starting acceleration corresponding to the acceleration request from the driver. On the other hand, when the accelerator pedal opening APO is less than the predetermined opening, the vehicle is started with the automatic transmission 20 set to a speed ratio higher than the speed ratio when the accelerator pedal opening is equal to or greater than the predetermined opening, so that the deterioration of fuel consumption can be suppressed. Therefore, it is possible to improve acceleration performance during starting of the vehicle 100 while suppressing the deterioration of fuel consumption.

The automatic transmission 20 includes the variator 4 provided with the pair of pulleys 4a, 4b on the engine 10 side and the drive wheels 50 side, respectively, and the belt 4c wound between the pair of pulleys 4a, 4b, and the stopper 4h that defines the lowest speed ratio $R_{ML}$ on the lowest side of the variator 4. The second speed ratio $R_2$ is the lowest speed ratio $R_{ML}$.

According to this configuration, the vehicle can be started with a speed ratio at the lowest side that can be structurally obtained as the automatic transmission 20 including the pair of pulleys 4a, 4b, and therefore the acceleration performance during starting of the vehicle 100 can be improved.

If a predetermined period of time elapses since the vehicle is started with the second speed ratio $R_2$ set, the automatic transmission 20 is shifted to a speed ratio higher than the second speed ratio $R_2$.

According to this configuration, the automatic transmission is shifted to a higher speed ratio after a predetermined period of time elapses since the response to the acceleration request from the driver during starting of the vehicle 100, so that the deterioration of fuel consumption can be suppressed.

After starting with the automatic transmission 20 set to the second speed ratio $R_2$ and the temperature of the sheave surfaces 4f, 4g of the pair of pulleys 4a, 4b reaches or exceeds a predetermined value, the automatic transmission is shifted to a speed ratio higher than the second speed ratio $R_2$.

According to this configuration, when the temperature of the sheave surfaces 4f, 4g of the pulleys 4a, 4b reaches or exceeds the predetermined value after responding to the acceleration request from the driver during starting of the vehicle 100, the automatic transmission is shifted to a higher speed ratio, so that a load on the pulleys 4a, 4b can be reduced.

After starting with the automatic transmission 20 set to the second speed ratio $R_2$ and the temperature of the lubricating oil reaches or exceeds a predetermined value, the automatic transmission is shifted to a speed ratio higher than the second speed ratio $R_2$.

According to this configuration, when the temperature of the lubricating oil reaches or exceeds the predetermined value after responding to the acceleration request from the driver during starting of the vehicle 100, the automatic transmission is shifted to a higher speed ratio, so that the load on the pulleys 4a, 4b can be reduced.

When starting with the accelerator pedal opening APO less than a predetermined opening, the automatic transmission 20, which is shifted to the stopped speed ratio $R_S$ during stopping before changing from the running state to the stopped state, is set to a speed ratio higher than the stopped speed ratio $R_S$, and when starting with the accelerator pedal opening APO equal to or greater than the predetermined opening, the automatic transmission 20 is set to the stopped speed ratio $R_S$.

In the method for controlling the automatic transmission 20, which is shifted to the stopped speed ratio $R_S$ during stopping before changing from the running state to the stopped state, when starting with the accelerator pedal opening APO less than a predetermined opening, the automatic transmission 20 is set to a speed ratio higher than the stopped speed ratio $R_S$, and when starting with the accelerator pedal opening APO equal to or greater than the predetermined opening, the automatic transmission 20 is set to the stopped speed ratio $R_S$.

According to these configurations, when the accelerator pedal opening APO is less than the predetermined opening, by starting with a speed ratio higher than the stopped speed ratio $R_S$, it is possible to respond to the acceleration request from the driver. When the accelerator pedal opening APO is less than the predetermined opening, by starting with the stopped speed ratio $R_S$, it is possible to suppress the deterioration of fuel consumption.

When starting with the accelerator pedal opening APO less than a predetermined opening, the automatic transmission 20, which is shifted to the stopped speed ratio $R_S$ during stopping before changing from the running state to the stopped state, is set to the stopped speed ratio $R_S$, and when starting with the accelerator pedal opening APO equal to or greater than the predetermined opening, the automatic transmission 20 is set to a speed ratio lower than the stopped speed ratio $R_S$.

In the method for controlling the automatic transmission 20, which is shifted to the stopped speed ratio $R_S$ during stopping before changing from the running state to the stopped state, when starting with the accelerator pedal opening APO less than a predetermined opening, the automatic transmission 20 is set to the stopped speed ratio $R_S$, and when starting with the accelerator pedal opening APO equal to or greater than the predetermined opening, the automatic transmission 20 is set to a speed ratio lower than the stopped speed ratio $R_S$.

According to these configurations, when the accelerator pedal opening APO is equal to or greater than the predetermined opening, by starting with a speed ratio lower than the speed ratio when the accelerator pedal opening is less than the predetermined opening, it is possible to respond to the acceleration request from the driver. When the accelerator pedal opening APO is less than the predetermined opening, by starting with a speed ratio higher than the speed ratio when the accelerator pedal opening is equal to or greater than the predetermined opening, it is possible to suppress the deterioration of fuel consumption.

While an embodiment of the invention has been described, the embodiment is merely one of application examples of the invention, and does not intend to limit a technical scope of the invention to a specific configuration according to the embodiment.

Various programs executed by the transmission controller 40 may be stored in a non-transitory recording medium such as a CD-ROM.

DESCRIPTION OF REFERENCE SIGNS 20 automatic transmission
4 variator
4a primary pulley (pulley)
4b secondary pulley (pulley)
4f sheave surface
4g sheave surface
4h stopper
40 transmission controller (computer)

The present application claims a priority of Japanese Patent Application No. 2021-007013 filed with the Japan Patent Office on Jan. 20, 2021, all the contents of which are hereby incorporated by reference.

The invention claimed is:

1. An automatic transmission, comprising:
a transmission mechanism including a pair of pulleys provided on a drive source side and a drive wheel side, respectively, and an endless member wound between the pair of pulleys; and
a stopper that defines a lowest speed ratio on a lowest side of the transmission mechanism, wherein
when starting with an accelerator pedal opening less than a predetermined opening, the automatic transmission is set to a first speed ratio, and when starting with the accelerator pedal opening equal to or greater than the predetermined opening, the automatic transmission is set to a second speed ratio, which is the lowest speed ratio defined by the stopper and is lower than the first speed ratio.

2. The automatic transmission according to claim 1, wherein
after starting with the automatic transmission set to the second speed ratio, when a predetermined period of time elapses, the automatic transmission is shifted to a speed ratio higher than the second speed ratio.

3. The automatic transmission according to claim 1, wherein
after starting with the automatic transmission set to the second speed ratio, when a temperature of sheave surfaces of the pair of pulleys reaches or exceeds a predetermined value, the automatic transmission is shifted to a speed ratio higher than the second speed ratio.

4. The automatic transmission according to claim 1, wherein
after starting with the automatic transmission set to the second speed ratio, when a temperature of lubricating oil reaches or exceeds a predetermined value, the automatic transmission is shifted to a speed ratio higher than the second speed ratio.

5. An automatic transmission shifted to a stopped speed ratio during stopping, before changing from a running state to a stopped state, the automatic transmission comprising:
- a transmission mechanism including a pair of pulleys provided on a drive source side and a drive wheel side, respectively, and an endless member wound between the pair of pulleys; and
- a stopper that defines a lowest speed ratio on a lowest side of the transmission mechanism, wherein
- when starting with an accelerator pedal opening less than a predetermined opening, the automatic transmission is set to a speed ratio higher than the stopped speed ratio, and when starting with the accelerator pedal opening equal to or greater than the predetermined opening, the automatic transmission is set to the stopped speed ratio, and
- the stopped speed ratio is the lowest speed ratio defined by the stopper.

6. An automatic transmission shifted to a stopped speed ratio during stopping, before changing from a running state to a stopped state, the automatic transmission comprising:
- a transmission mechanism including a pair of pulleys provided on a drive source side and a drive wheel side, respectively, and an endless member wound between the pair of pulleys; and
- a stopper that defines a lowest speed ratio on a lowest side of the transmission mechanism, wherein
- when starting with an accelerator pedal opening (accelerator pedal opening degree) less than a predetermined opening, the automatic transmission is set to the stopped speed ratio, and when starting with the accelerator pedal opening equal to or greater than the predetermined opening, the automatic transmission is set to the lowest speed ratio, which is defined by the stopper and is lower than the stopped speed ratio.

* * * * *